United States Patent
Uemura et al.

(10) Patent No.: US 7,269,493 B2
(45) Date of Patent: Sep. 11, 2007

(54) LANE DEPARTURE PREVENTION APPARATUS

(75) Inventors: Yoshitaka Uemura, Kawasaki (JP); Takashi Sugano, Kawasaki (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/960,973

(22) Filed: Oct. 12, 2004

(65) Prior Publication Data

US 2005/0096828 A1 May 5, 2005

(30) Foreign Application Priority Data

Oct. 29, 2003 (JP) ............... 2003-369449

(51) Int. Cl.
*G06F 19/00* (2006.01)

(52) U.S. Cl. ............... 701/70; 701/301; 701/41; 340/465; 340/438; 340/436; 340/575

(58) Field of Classification Search ............... 701/70, 701/301, 29, 51, 300, 41, 96; 180/169, 167, 180/170; 340/425.5, 438, 441, 465, 475, 340/436, 903, 575, 576, 435; 348/148
See application file for complete search history.

(56) References Cited

U.S. PATENT DOCUMENTS

| | | | | |
|---|---|---|---|---|
| 5,642,093 A | * | 6/1997 | Kinoshita et al. | 340/439 |
| 5,765,116 A | * | 6/1998 | Wilson-Jones et al. | 701/41 |
| 6,256,584 B1 | * | 7/2001 | Kodaka et al. | 701/301 |
| 6,338,022 B1 | * | 1/2002 | Shinmura et al. | 701/301 |
| 6,411,901 B1 | * | 6/2002 | Hiwatashi et al. | 701/301 |
| 6,487,501 B1 | * | 11/2002 | Jeon | 701/301 |
| 6,571,176 B1 | | 5/2003 | Shinmura et al. | |
| 6,882,287 B2 | * | 4/2005 | Schofield | 340/903 |
| 2001/0014846 A1 | * | 8/2001 | Sawamoto et al. | 701/96 |
| 2002/0087255 A1 | | 7/2002 | Jindo et al. | |
| 2002/0095246 A1 | | 7/2002 | Kawazoe | |
| 2002/0177935 A1 | * | 11/2002 | Winner et al. | 701/93 |
| 2003/0045982 A1 | * | 3/2003 | Kondo et al. | 701/41 |
| 2003/0045983 A1 | * | 3/2003 | Kondo et al. | 701/41 |
| 2003/0156015 A1 | * | 8/2003 | Winner et al. | 340/425.5 |
| 2003/0195684 A1 | * | 10/2003 | Martens | 701/41 |
| 2004/0010371 A1 | * | 1/2004 | Matsumoto et al. | 701/300 |
| 2004/0100373 A1 | * | 5/2004 | Ponziani | 340/476 |
| 2004/0193374 A1 | * | 9/2004 | Hac et al. | 701/301 |
| 2005/0182539 A1 | * | 8/2005 | Maass | 701/41 |

FOREIGN PATENT DOCUMENTS

| | | |
|---|---|---|
| JP | 2000-033860 A | 2/2000 |
| KR | 10-1998-61720 A | 10/1998 |
| KR | 10-2000-63151 A | 11/2000 |

* cited by examiner

*Primary Examiner*—Tuan C To
(74) *Attorney, Agent, or Firm*—Global IP Counselors (57) ABSTRACT

A lane departure prevention apparatus is provided to improve safety while preventing lane departure. The lane departure prevention apparatus determines whether or not the driver is holding the steering wheel steady, determines whether or not the host vehicle has a tendency to depart from its driving lane, and, on the basis of these determination results, outputs a warning and performs braking control for avoiding the lane departure of the host vehicle when the host vehicle has a tendency to depart from its driving lane, and the driver is not holding the steering wheel steady.

13 Claims, 4 Drawing Sheets

LANE DEPARTURE PREVENTION APPARATUS

BACKGROUND OF THE INVENTION

1. Field of the Invention

The present invention generally relates to a lane departure prevention apparatus for preventing a host vehicle from departing from a driving lane when the host vehicle is about to depart from the lane or departure seems imminent.

2. Background Information

Conventional lane departure prevention apparatuses include apparatuses for imparting yaw moment to the host vehicle by controlling the braking force to the wheel and preventing the host vehicle from deviating from the driving lane. These conventional lane departure prevention apparatuses also inform the driver that the host vehicle may possibly depart from the driving lane by providing this yaw moment in cases in which there is a possibility that the host vehicle may depart from a driving lane. For example, one such lane departure prevention apparatus is disclosed in Japanese Laid-Open Patent Publication No. 2000-33860.

In view of the above, it will be apparent to those skilled in the art from this disclosure that there exists a need for an improved lane departure prevention apparatus. This invention addresses this need in the art as well as other needs, which will become apparent to those skilled in the art from this disclosure.

SUMMARY OF THE INVENTION

It has been discovered that in the above mentioned lane departure prevention apparatus, for example, a lateral shift detector detects the lateral shift of the host vehicle driving position from a driving lane reference position, and a braking force is imparted based on the detected lateral shift thereof. The yaw moment is thereby provided to the host vehicle and the host vehicle is prevented from deviating from the driving lane. Thus, the technology discussed in the above mentioned lane departure prevention apparatus involves nothing more than preventing the lane departure of the host vehicle by taking into account just the positional relationship between the driving lane and the host vehicle.

However, if yaw moment is imparted to the vehicle for departure prevention when the driver is not holding the steering wheel steady, the sudden lateral acceleration may cause the driver to lose his balance.

The present invention was conceived in light of the above problems. One object of the present invention is to provide a lane departure prevention apparatus in which lane departure can be prevented in a state in which the driver is holding the steering wheel steady.

In order to solve some of the above-described problems, a lane departure prevention apparatus of the present invention is provided with a holding state detection section, a warning output section, a lane departure tendency detection section and a lane departure-avoidance control section. The holding state detection section is configured to detect whether the driver is holding the steering wheel steady. The warning output section is configured to output a warning. The lane departure tendency detection section is configured to detect a lane departure tendency of a host vehicle from its driving lane. The lane departure-avoidance control section is configured to output the warning from the warning output section prior to performing lane departure avoidance braking control when the lane departure tendency detection section detects the lane departure tendency and the holding state detection section detects that the driver is not holding the steering wheel steady.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended Claims and their equivalents.

First Embodiment

Figure 1:
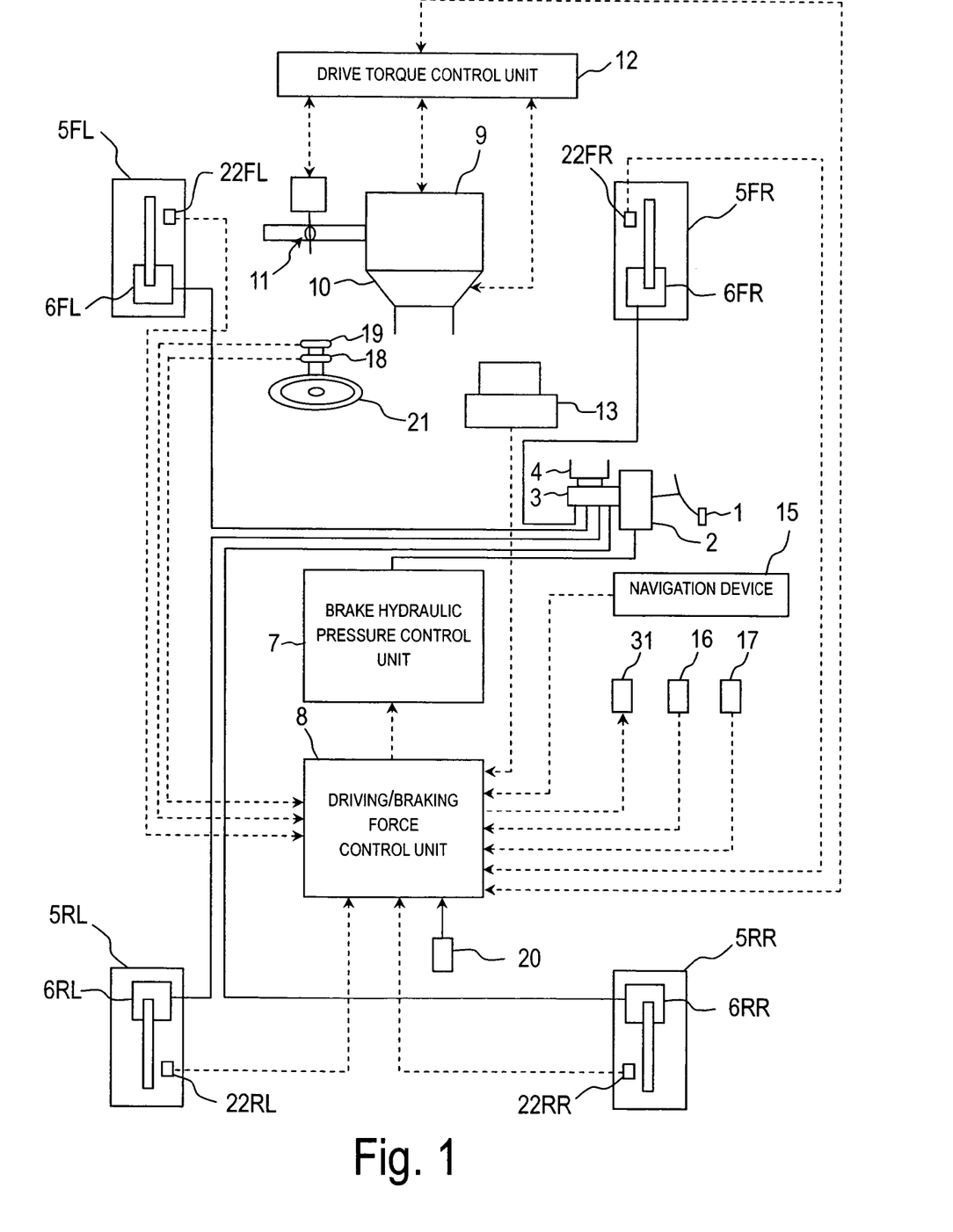
FIG. 1 is a schematic structural diagram of a vehicle equipped with a lane departure prevention apparatus in accordance a first embodiment of the present invention.

Referring initially to FIG. 1, a schematic structural diagram of a host vehicle is illustrated that is equipped with a lane departure prevention apparatus in accordance with a first embodiment of the present invention. The embodiment is a rear wheel drive vehicle equipped with the lane departure prevention apparatus of the present invention. This rear-wheel-drive vehicle is equipped with an automatic transmission and a conventional differential gear, and with a braking system that allows independent control of braking force at the front and rear wheels and the left and right wheels.

In the diagram of FIG. 1, the host vehicle is basically equipped with a brake pedal 1, a booster 2, a master cylinder 3, a reservoir 4, a pair of front wheels 5FL and 5FR, a pair of rear wheels 5RL and 5RR, a pair of front wheel cylinders 6FL and 6FR, a pair of rear wheel cylinders 6RL and 6RR, a brake hydraulic pressure control unit 7, a driving/braking force control unit 8, an internal combustion engine 9, an automatic transmission 10, a throttle valve 11, a drive torque control unit 12, an imaging unit 13, a navigation device 15, a master cylinder pressure sensor 16, an accelerator depression or throttle aperture opening sensor 17, a torque sensor 18, a steering angle sensor 19, a turn signal switch 20, a steering wheel 21, a pair of front wheel velocity sensors 22FL to 22FR and a pair of rear wheel velocity sensors 22RL to 22RR. This vehicle is also equipped with an alarm sound output unit 31. This alarm sound output unit 31 is driven by drive signals from the driving/braking control unit 8. The drive timing and so forth of this alarm sound output unit 31 will be discussed in detail below.

Brake hydraulic pressure boosted by the master cylinder 3 is ordinarily supplied to the wheel cylinders 6FL to 6RR of the wheels 5FL to 5RR according to how far the driver depresses the brake pedal 1. Also, the brake hydraulic pressure control unit 7 is interposed between the master cylinder 3 and the wheel cylinders 6FL to 6RR, so that the brake hydraulic pressure of the wheel cylinders 6FL to 6RR can be individually controlled by this brake hydraulic pressure control unit 7.

The wheel cylinders 6FL to 6RR, the brake hydraulic pressure control unit 7, the driving/braking force control unit 8 all form part of a braking apparatus that allows independent control of braking force for the front and rear wheels and the left and right wheels. The brake hydraulic pressure is boosted by the master cylinder 3 such that the brake fluid is ordinarily fed to the wheel cylinders 6FL to 6RR of the wheels 5FL to 5RR in accordance with the downward force (depression amount) exerted by the driver on the brake pedal 1. Also, the brake hydraulic pressure control unit 7 is interposed between the master cylinder 3 and the wheel cylinders 6FL to 6RR for allowing the brake hydraulic pressure of the wheel cylinders 6FL to 6RR to be individually controlled by the brake hydraulic pressure control unit 7.

The brake hydraulic pressure control unit 7 is preferably configured and arranged, for example, to carry out anti-skid control and traction control. The brake hydraulic pressure control unit 7 is also configured and arranged to independently control the braking hydraulic pressure of the wheel cylinders 6FL to 6RR. Thus, the brake hydraulic pressure control unit 7 is also configured so as to control the brake hydraulic pressure in accordance with a brake hydraulic pressure command value when the brake hydraulic pressure command value is input from the driving/braking force control unit 8 (described below).

The controller 8 preferably includes a microcomputer with a lane departure prevention control program that controls the wheel cylinders 6FL, 6FR, 6RL and 6RR to apply a yaw moment to the host vehicle as discussed below. The controller 8 can also include other conventional components such as an input interface circuit, an output interface circuit, and storage devices such as a ROM (Read Only Memory) device and a RAM (Random Access Memory) device. The memory circuit stores processing results and control programs such as ones for controlling the braking control operations that are run by the processor circuit. The controller 8 is operatively coupled to the above mentioned sensors in a conventional manner. The internal RAM of the controller 8 stores statuses of operational flags and various control data. The internal ROM of the controller 8 stores the programs and predetermined variables for various operations. The controller 8 is capable of selectively controlling any number of the components of the host vehicle as needed and/or desired. It will be apparent to those skilled in the art from this disclosure that the precise structure and algorithms for the controller 8 can be any combination of hardware and software that will carry out the functions of the present invention. In other words, "means plus function" clauses as utilized in the specification and Claims should include any structure or hardware and/or algorithm or software that can be utilized to carry out the function of the "means plus function" clause.

The controller 8 of the present invention performs braking control to avoid lane departure of the host vehicle only after the output of an alarm when the host vehicle has a tendency to depart from its driving lane and when the driver is not holding the steering wheel steady. The result being that the driver is encouraged by the alarm output to hold the steering wheel steady prior to the commencement of braking control for avoidance.

The drive torque control unit 12 controls the drive torque to the rear wheels 5RL and 5RR, which are the drive wheels, by controlling the operating conditions of the engine 9, the selected gear ratio of the automatic transmission 10, and/or the throttle opening of a throttle valve 11. The drive torque control unit 12 controls the fuel injection amount and the ignition timing, and controls the operating condition of the engine 9 by simultaneously controlling the size of the throttle aperture. With this drive torque control unit 12, the value of the drive torque Tw that is used for control is output to the driving/braking force control unit 8.

The drive torque control unit 12 is also configured to independently control the drive torque of the rear wheels 5RL and 5RR. Thus, the drive torque control unit 12 is also configured to control the drive wheel torque in accordance with a drive torque command value when the drive torque command value is input from the driving/braking force control unit 8.

The imaging unit 13 has a picture processing function. The imaging unit 13 is designed to detect the position of the host vehicle in the driving lane in order to detect the lane departure tendency of the host vehicle. The imaging unit 13 is configured to pick up an image with a monocular (single-lens) camera composed of a CCD (Charge Coupled Device) camera, for example. The imaging unit 13 is preferably disposed on the front of the host vehicle.

The imaging unit 13 is preferably configured and arranged to detect white lines or other lane markers, for example, from the imaging picture taken of the area in front of the host vehicle. Thus, the driving lane is detected based on the detected lane markers. Furthermore, the imaging unit 13 calculates the angle (yaw angle) $\phi$ formed by the driving lane of the host vehicle and the longitudinal axis of the host vehicle, the lateral displacement X from the center of the driving lane, the driving lane curvature $\beta$, and the like based on the detected driving lane. The imaging unit 13 outputs the calculated yaw angle $\phi$, the calculated lateral displacement X, the calculated driving lane curvature $\beta$, and the like to the driving/braking force control unit 8.

The navigation device 15 is preferably configured and arranged to detect the yaw rate $\phi'$ and the lateral acceleration Xg and/or the longitudinal acceleration Yg generated in the host vehicle. The navigation device 15 outputs the detected lateral acceleration Xg, the detected longitudinal acceleration Yg, and the detected yaw rate $\phi'$ to the driving/braking force control unit 8. The navigation device 15 also outputs road information to the driving/braking force control unit 8. Preferably, the road information (i.e., host vehicle driving environment) includes information about the type of the road, such as the number of lanes and whether the road is an ordinary road or an expressway.

Detection signals detected by these sensors or the like are outputted to the driving/braking force control unit 8.

The master cylinder pressure sensor 16 is preferably configured and arranged to detect the output pressure of the master cylinder 3, that is, the master cylinder hydraulic pressures Pmf and Pmr. The accelerator depression or throttle aperture opening sensor 17 is preferably configured and arranged to detect the downward force on the accelerator pedal 1 or the throttle aperture opening size to output a signal indicative of the aperture size Acc. The steering angle sensor 19 is preferably configured and arranged to detect the steering angle δ of the steering wheel 21. The torque sensor 18 is preferably configured and arranged to detect the steering torque Tq applied to the steering wheel 21 by the driver. The turn signal switch 20 is preferably configured and arranged to detect turn signal operation with a turn signal indicator. The wheel velocity sensors 22FL to 22RR are preferably configured and arranged to detect the rotational velocity of the wheels 5FL to 5RR, that is, the so-called wheel velocity Vwi (i=fl, fr, rl, rr). All of these detection signals detected by these sensors or the like are output to the driving/braking force control unit 8.

The alarm sound output unit 31 is driven by drive signals from the driving/braking control unit 8. The drive timing and so forth of this alarm sound output unit 31 will be discussed in detail below.

When there is left or right directionality in the detected driving condition or state data of the host vehicle, the two directions are set such that the left direction is the positive direction. In other words, the yaw rate $\phi'$, the longitudinal acceleration Yg, and the yaw angle $\phi$ are positive values when turning left, and the lateral displacement X is a positive value when shifting from the center of the driving lane to the left.

Figure 2:
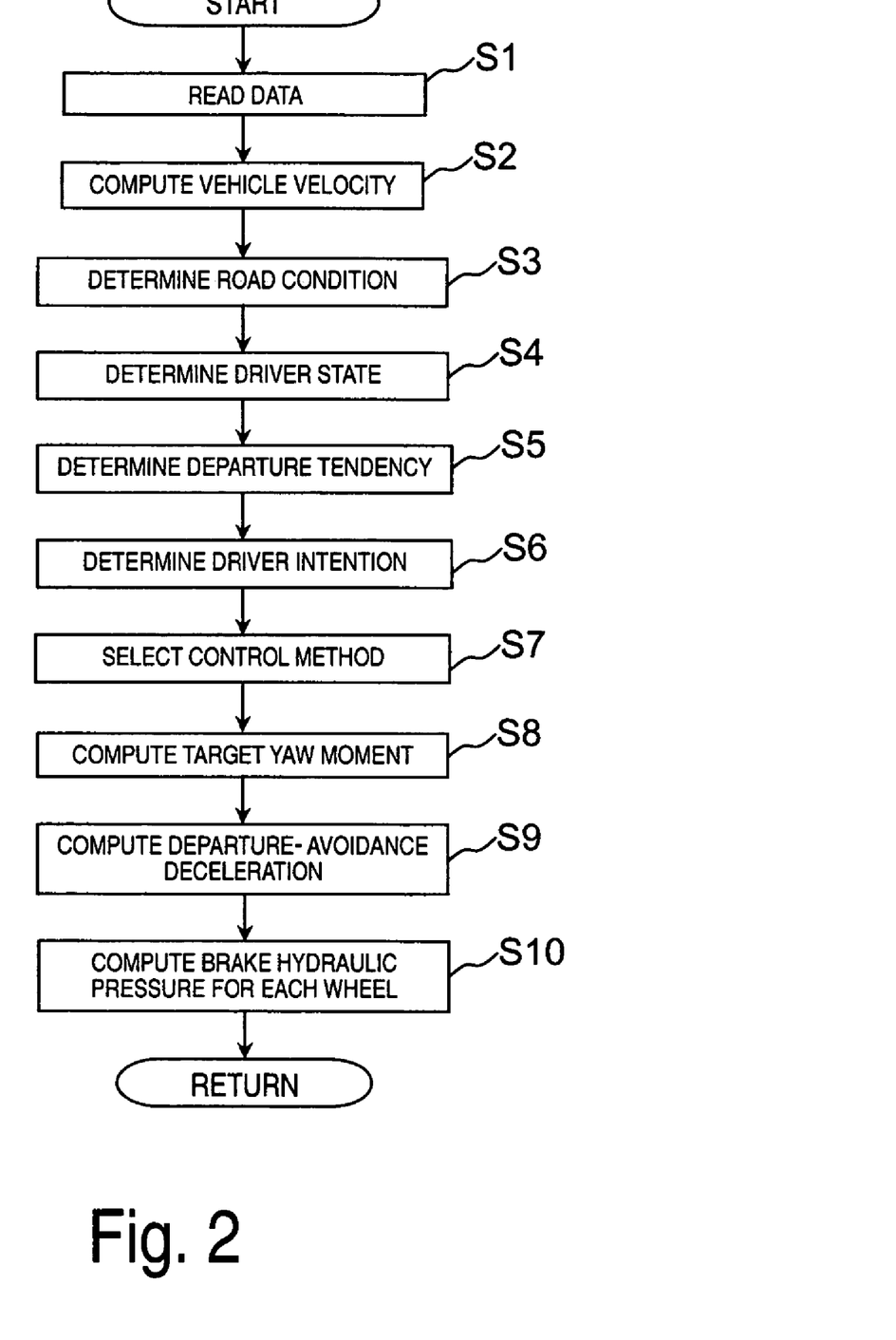
FIG. 2 is a flowchart showing the processing content of the driving/braking force control unit comprising the lane departure prevention apparatus.

Next, a computational processing procedure performed by the driving/braking force control unit 8 for avoiding lane departure will now be described below with reference to FIG. 2. This computational processing is executed by using a timer interrupt at each specific predetermined sampling time interval $\Delta T$, such as every 10 msec for example. Communication processing is not included in the processing shown in FIG. 2, but the information obtained by computational processing is updated and stored in random access memory, and required information is read out from the random access memory when required.

The driving/braking force control unit 8 is configured so as to control the components constituting the vehicle. In other words, the driving/braking force control unit 8 is configured so as to control each of the components on the basis of signals or the like input from sensors and other components as described above. More specifically, control by the driving/braking force control unit 8 includes control for preventing the vehicle from departing from the driving lane when the vehicle is tending toward departure from the driving lane. Thus, the system for avoiding departure is composed of the driving/braking force control unit 8.

First, in step S1, various kinds of data are read from the above-described sensors or from a controller or control unit by the driving/braking force control unit 8. More specifically, the following types of data are read: the lateral acceleration Xg, the longitudinal acceleration Yg, the yaw rate $\phi'$, and the road information obtained by the navigation device 15; the wheel velocity Vwi; the steering angle δ; steering torque Tq, the accelerator depression amount or throttle opening aperture size Acc; the master cylinder hydraulic pressures Pmf and Pmr; the turn switch signal WS from the turn signal switch 20; the drive torque Tw from the drive torque control unit 12; and the yaw angle $\phi$, the lateral displacement X, and the driving lane curvature β from the imaging unit 13.

Next, the processing moves to step S2 where, the host vehicle velocity V is calculated based on the average value of the wheel velocities of the non-driven wheels. In the illustrated embodiment, the host vehicle is driven by the rear wheels, so the host vehicle velocity V is calculated based on the velocities $Vw_{FL}$ and $Vw_{FR}$ of the front left and right wheels 5FL and 5FR. In any case, the host vehicle velocity V is calculated using one of the Equations (1) as shown below, based on the wheel velocity Vwi of the non-driven wheels that was read in the above-described step S1.

$V=(Vwrl+Vwrr)/2$ for front wheel drive, and $V=(Vwfl+Vwfr)/2$ for rear wheel drive  (1)

In Equation (1), the terms Vwfl and Vwfr are the respective wheel velocities of the left and right front wheels, and the terms Vwrl and Vwrr are the respective wheel velocities of the left and right rear wheels. In other words, in Equation (1), the host vehicle velocity V is calculated as the average value of the wheel speed of the driven wheels. In the present embodiment, the host vehicle is driven by the rear wheels, so the host vehicle velocity is calculated from the latter equation, i.e., based on the wheel velocity of the front wheels 5FL and 5FR.

Also, the host vehicle velocity V calculated in this manner is preferably used during normal driving. In other words, when the ABS (Anti-lock Brake System) control or the like is operating, for example, the estimated car body velocity that is estimated in the ABS control is used as the above-described vehicle velocity V. The value being used for the navigation information in the navigation device 15 can also be used as the above-described vehicle velocity V.

The road condition or host vehicle driving environment is then evaluated in step S3 by the driving/braking force control unit 8. Specifically, it is determined whether the lane in which the host vehicle is traveling is straight or curved on the basis of the driving lane curvature β read in step S1. The determination is made, for example, based on the video information from the imaging unit 13 and on the road information from the navigation device 15. Thus, the curvature of road or lane on which the host vehicle is traveling is detected as the road condition or driving environment. For instance, the driving lane curvature β is compared with a specific driving lane curvature threshold βL, and when the driving lane curvature β is less than the specific driving lane curvature threshold βL (β<βL), the host vehicle driving lane is considered to be straight, but when the driving lane curvature β is greater than or equal to the specific driving lane curvature threshold βL (β≧βL), the host vehicle driving lane is considered to be curved.

The state of the driver is then evaluated in step S4 by the driving/braking force control unit 8. Here, it is determined whether or not the driver is holding the steering wheel 21 steady. Specifically, whether or not the driver is holding the steering wheel 21 steady is determined on the basis of the steering torque Tq applied to the steering wheel 21 by the driver, as previously read in step S1. Here, if the steering torque Tq is greater than a specific threshold, then it is decided that the driver is holding the steering wheel 21 steady, and a holding determination flag $F_{strg}$ is set to ON ($F_{strg}$=ON). If the steering torque Tq is less than or equal to the specific threshold, then it is decided that the driver is not holding the steering wheel 21 steady, and the holding determination flag $F_{strg}$ is set to OFF ($F_{strg}$=OFF).

A time element may also be incorporated into this evaluation. That is, if the conclusion that the driver is holding the steering wheel 21 steady, made on the basis of the steering torque Tq, is recognized as having continued for a specific length of time, then the holding determination flag $F_{strg}$ is set to ON ($F_{strg}$=ON). If the conclusion that the driver is holding the steering wheel 21 steady, made on the basis of the steering torque Tq, is not recognized as having continued for a specific length of time, then the holding determination flag $F_{strg}$ is set to OFF ($F_{strg}$=OFF).

The lane departure tendency is then determined in step S5. The processing procedure for this determination is specifically shown in FIG. 3.

Figure 3:
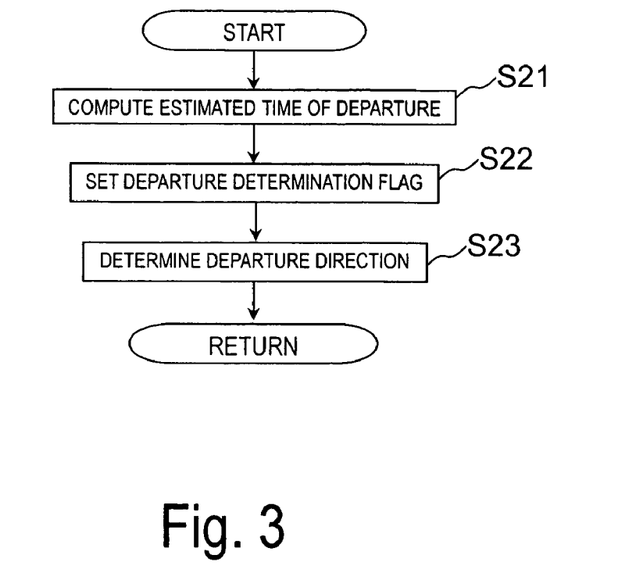
FIG. 3 is a flowchart illustrating the processing for determining a lane departure tendency by the driving/braking force control unit.

First, the estimated time of departure $T_{out}$ is calculated in step S21. More specifically, the estimated time of departure $T_{out}$ is calculated with Equation (2) shown below by designating dx as the amount of variation (amount of variation per unit time) of the lateral displacement X, designating L as the lane width, and using the lateral displacement X (see, FIG. 4 for the values of X, dx, and L).

$$T_{out}=(L/2-X)/dx \quad (2)$$

Figure 4:
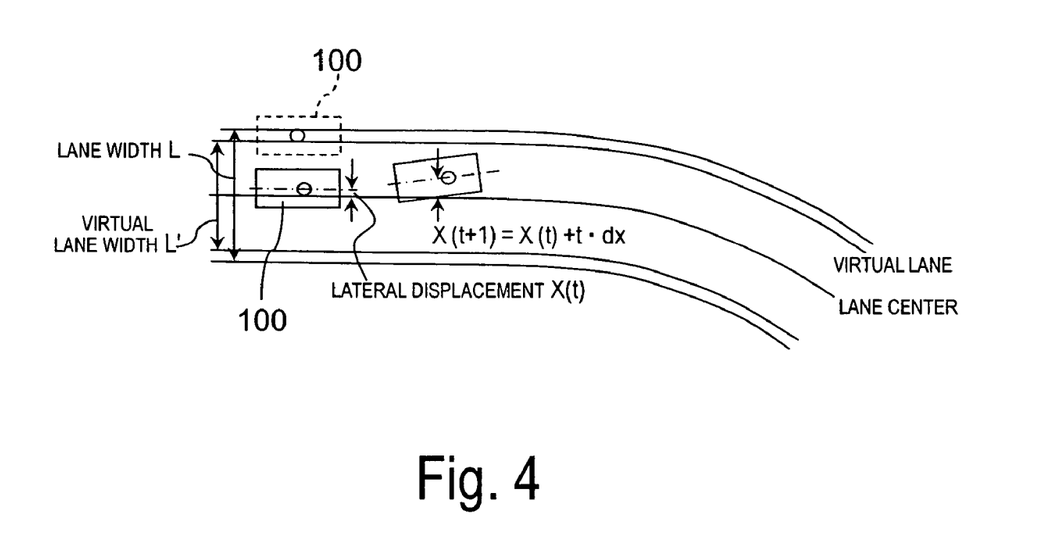
FIG. 4 is a diagram used for describing the estimated time of departure $T_{out}$.

The estimated time of departure $T_{out}$ until the host vehicle 100 laterally displaced by an amount equal to the lateral displacement X from the center of the lane (X=0) arrives at an externally positioned area (such as the road shoulder) separated by an amount equal to the distance L/2 from the center of the lane can be computed with Equation (2). The lane width L is obtained from the imaging picture processed by the imaging unit 13. The position of the host vehicle can also be obtained from the navigation device 15, and the lane width L can be obtained from the map data stored in the navigation device 15.

The lane departure determination flag is set in the subsequent step S22. More specifically, the estimated time of departure $T_{out}$ is compared with a predetermined first departure-determining threshold Ts. Here, when the estimated time of departure $T_{out}$ is less than the first departure-determining threshold Ts ($T_{out}$<Ts), it is determined that departure will occur (departure tendency exists), and the lane departure determination flag $F_{out}$ is set to ON ($F_{out}$=ON). When the estimated time of departure $T_{out}$ is equal to or greater than the first departure-determining threshold Ts ($T_{out} \geq$ Ts), it is determined that departure will not occur (departure tendency does not exist), and the lane departure determination flag $F_{out}$ is set to OFF ($F_{out}$=OFF).

When the host vehicle moves away from the center of the lane and the estimated time of departure $T_{out}$ is less than the first departure-determining threshold Ts ($T_{out}$<Ts), the lane departure determination flag $F_{out}$ is switched ON ($F_{out}$=ON) by the processing of step S22. When the host vehicle is in a state in which $F_{out}$=ON and returns to the center side of the lane, then the estimated time of departure $T_{out}$ is equal to or greater than the first departure-determining threshold Ts ($T_{out} \geq$ Ts), and the lane departure determination flag $F_{out}$ is switched OFF ($F_{out}$=OFF). When a lane departure tendency exists and, for example, if braking control (described hereinafter) is performed for avoiding lane departure, or if the driver himself takes evasive actions, then the lane departure determination flag $F_{out}$ is switched from ON to OFF.

When the holding determination flag $F_{strg}$ in step S4 is OFF, that is, when it is determined that the driver is not holding the steering wheel 21 steady, a specific setting dTs is added to the lane departure determination threshold Ts. As a result, the lane departure determination flag $F_{out}$ is switched to ON ($F_{out}$=ON) when the estimated departure time $T_{out}$ is less than this summed value (hereinafter referred to as the modified departure determination threshold) (Ts+dTs) ($T_{out}$<(Ts+dTs)).

The lane departure direction $D_{out}$ is subsequently determined based on the lateral displacement X in the step S23. More specifically, when the host vehicle is laterally displaced from the center of the lane in the left-hand direction, then that direction is set as the lane departure direction $D_{out}$ ($D_{out}$=left). When the host vehicle is laterally displaced from the center of the lane in the right-hand direction, then that direction is set as the lane departure direction $D_{out}$ ($D_{out}$=right).

The lane departure tendency is determined in step S5 as discussed above.

The intention of the driver to change lanes is determined in the subsequent step S6. More specifically, the intention of the driver to change lanes is determined as follows based on the steering angle δ and/or the turn switch signal obtained in step S1.

When the direction indicated by the turn switch signal (lighted blinker side) and the direction indicated by departure direction $D_{out}$ obtained in step S4 are the same, it is determined that the driver is intentionally changing lanes, and the lane departure determination flag $F_{out}$ is changed to OFF ($_{out}$=OFF). That is, the determination result is changed to indicate that no departure is imminent.

When the direction (lighted blinker side) indicated by the turn switch signal and the direction indicated by the lane departure direction $D_{out}$ obtained in step S4 are the same, it is determined that the driver is intentionally changing lanes, and the lane departure determination flag $F_{out}$ is changed to OFF ($F_{out}$=OFF). In other words, the determination result is changed, indicating that departure will not occur or no departure is imminent.

When the direction indicated by the turn switch signal (lighted blinker side) and the direction indicated by departure direction $D_{out}$ obtained in step S4 are different, the lane departure determination flag $F_{out}$ is maintained, and the lane departure determination flag $F_{out}$ is left ON ($F_{out}$=ON). That is, the determination result indicating that departure is imminent is maintained.

When the direction (lighted blinker side) indicated by the turn switch signal and the direction indicated by departure direction $D_{out}$ obtained in step S4 are different, the lane departure determination flag $F_{out}$ is maintained, and the lane departure determination flag $F_{out}$ is left ON ($F_{out}$=ON). In other words, the determination result is maintained, indicating that departure will occur or is imminent.

When the turn signal switch 20 has not been operated, the driver intention to change lanes is determined based on the steering angle δ. In other words, in the case that the driver steers in the lane departure direction, it is determined that the driver is intentionally changing lanes when the steering angle δ and the amount of variation Δδ (amount of variation per unit time) in the steering angle are equal to or greater than a set value, and the lane departure determination flag $F_{out}$ is changed to OFF ($F_{out}$=OFF). The intention of the driver to change lanes may also be determined on the basis of the steering torque Tq.

The control method for departure avoidance is selected in the subsequent step S7. More specifically, a determination is made as to whether or not to issue a departure alarm and/or to perform departure-avoiding braking control. The braking control method is selected when the lane departure-avoiding braking control is performed. These various decisions are made on the basis of the road condition obtained in step S3, the holding determination flag $F_{strg}$ obtained in step S4, and the lane departure determination flag $F_{out}$ and departure direction $D_{out}$ obtained in step S5. This will be discussed in detail below.

The target yaw moment generated in the host vehicle is calculated in the subsequent step S8. This target yaw moment is a yaw moment imparted to the host vehicle for departure avoidance. More specifically, the target yaw moment Ms is calculated with Equation (3) below based on the amount of variation dx and the lateral displacement X obtained in step S1.

$$Ms = K1 \cdot X + K2 \cdot dx \quad (3)$$

Figure 5:
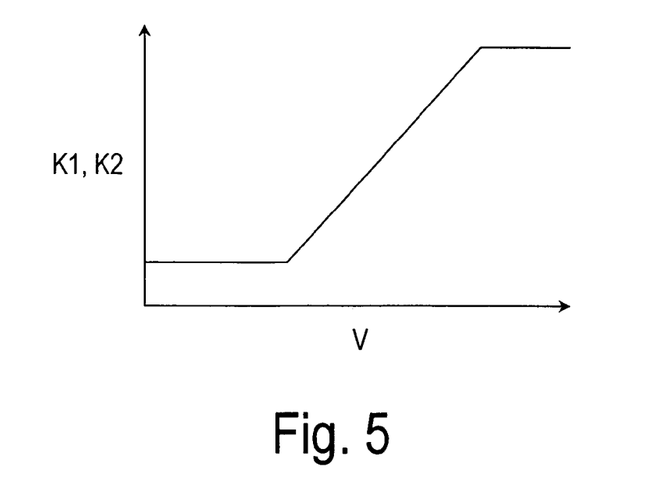
FIG. 5 is a graph of the characteristics of the gains K1 and K2 that are used for calculating the yaw moment Ms.

In Equation (3), the terms K1 and K2 are the gains that vary or fluctuate in accordance with the host vehicle velocity V. For example, in FIG. 5, the gains K1 and K2 have lower values at low speeds, increase in a corresponding relationship with the host vehicle velocity V when the host vehicle velocity V reaches a certain value, and remain constant thereafter when a certain vehicle velocity V is reached.

The lane departure-avoiding deceleration is calculated in the subsequent step S9. In other words, the braking force applied to both the left and right wheels is calculated with the aim of decelerating the host vehicle. Here, such a braking force is calculated as target brake hydraulic pressures Pgf and Pgr applied to both the left and right wheels. The target brake hydraulic pressure Pgf for the front wheels is calculated with Equation (4) below.

$$Pgf = Kgv \cdot V + Kgx \cdot dx \quad (4)$$

Figure 6:
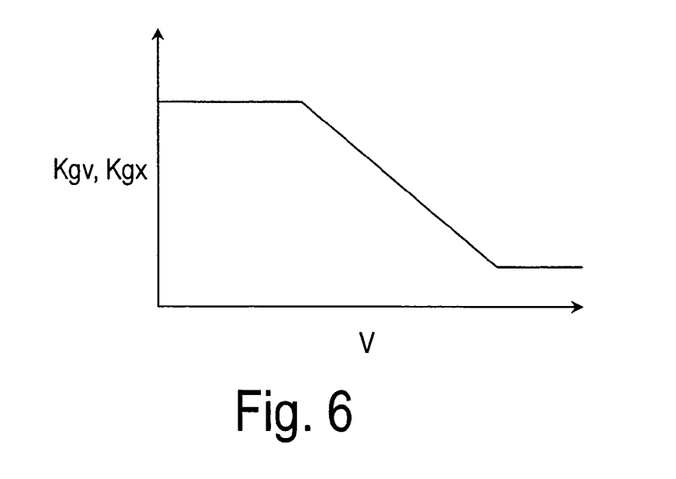
FIG. 6 is a graph of the characteristics of the conversion factors Kgv and Kgx that are used for calculating the target brake hydraulic pressure Pgf.

In Equation (4), the terms Kgv and Kgx are conversion factors for converting the braking force into brake hydraulic pressure. The conversion factors Kgv and Kgx are respectively set based on the host vehicle velocity V and the amount of variation dx. For example, in FIG. 6 the conversion factors Kgv and Kgx have higher values at low speeds, decrease in a corresponding relationship with the host vehicle velocity V when the host vehicle velocity V reaches a certain value, and remain constant thereafter when a certain vehicle velocity V is reached.

The target brake hydraulic pressure Pgr is calculated for the rear wheels based on the target brake hydraulic pressure Pgf for the front wheels while taking the front and rear braking distribution into consideration.

The deceleration (more specifically, the target brake hydraulic pressure Pgf and Pgr) for departure avoidance is obtained in this manner in step S9.

The target brake hydraulic pressure for each wheel is calculated in the subsequent step S10. In other words, the final brake hydraulic pressure is calculated based on the presence of departure-avoiding braking control. More specifically, the calculation is performed in the following manner.

(1) When the lane departure determination flag $F_{out}$ is OFF ($F_{out}$=OFF), i.e., when it is determined that departure will not occur, the target brake hydraulic pressure Psi (i=fl, fr, rl, rr) for each wheel is set as the master cylinder hydraulic pressure Pmf or Pmr, as shown in Equations (5) and (6) below.

$$Psfl = Psfr = Pmf \quad (5)$$

$$Psrl = Psrr = Pmr \quad (6)$$

In Equations (5) and (6), the term Pmf is the master cylinder hydraulic pressure for the front wheels, while the term Pmr is the master cylinder hydraulic pressure for the rear wheels. The rear wheel master cylinder hydraulic pressure Pmr is a value calculated based on the master cylinder hydraulic pressure Pmf for the front wheels while taking the front and rear braking distribution into consideration.

(2) When the lane departure determination flag $F_{out}$ is ON ($F_{out}$=ON), i.e., when it is determined that departure will occur, the front wheel target brake hydraulic pressure difference ΔPsf and the rear wheel target brake hydraulic pressure difference ΔPsr are first calculated based on the target yaw moment Ms. More specifically, the target brake hydraulic pressure differences ΔPsf and ΔPsr are calculated with Equations (7) to (10) below.

When Ms<Ms1, then $$\Delta Psf = 0 \quad (7)$$

$$\Delta Psr = 2 \cdot Kbr \cdot Ms / T \quad (8)$$

When Ms≧Ms1, then $$\Delta Psf = 2 \cdot Kbf \cdot (Ms - Ms1) / T \quad (9)$$

$$\Delta Psr = 2 \cdot Kbr \cdot Ms1 / T \quad (10)$$

In Equations (7) to (10), the term Ms1 is the threshold used for setting purposes, while the term T is the tread. The tread T is the same value for simplicity. The terms Kbf, and Kbr are conversion factors for the front and rear wheels when the braking force is converted to brake hydraulic pressure, and are set according to brake parameters or specifications.

The braking force applied to the wheels is thus distributed in accordance with the magnitude of the target yaw moment Ms. That is to say, when the target yaw moment Ms is less than the threshold Ms1 used for setting purposes, the front wheel target brake hydraulic pressure difference ΔPsf is set to 0, a predetermined value is assigned to the rear wheel target brake hydraulic pressure difference ΔPsr, and the braking force difference is generated in the left and right rear wheels. When the target yaw moment Ms is equal to or greater than the threshold Ms1 used for setting purposes, a predetermined value is assigned to the target brake hydraulic force differences ΔPsf and ΔPsr, and the braking force difference is generated in the front and rear left and right wheels.

When the lane departure determination flag $F_{out}$ is ON ($F_{out}$=ON), the final target brake hydraulic pressure Psi (i=fl, fr, rl, rr) for each wheel is calculated using the target brake hydraulic pressure differentials ΔPsf and ΔPsr and the target brake hydraulic pressures Pgf and Pgr calculated as above. Specifically, the final target brake hydraulic pressure Psi (i=fl, fr, rl, rr) for each wheel is calculated on the basis of the braking control method selected in step S7.

When the lane departure determination flag $F_{out}$ is ON ($F_{out}$=ON), the final target brake hydraulic pressure Psi (i=,fl, fr, rl, rr) for each wheel is calculated using the target brake hydraulic pressure differences ΔPsf and ΔPsr and the target brake hydraulic pressures Pgf and Pgr calculated as described above. More specifically, the final target brake hydraulic pressure Psi (i=fl, fr, rl, rr) for each wheel is calculated based on the braking control method selected in step S7.

The braking control method selected in step S7 will now be described.

In step S7, the control method for departure avoidance is selected on the basis of the road condition, the holding determination flag $F_{strg}$, the lane departure determination flag $F_{out}$, and the lane departure direction $D_{out}$. Specifically, the control method is selected as follows, on the assumption that the lane departure determination flag $F_{out}$ is ON. The various situations here will be described.

First Scenario

When the lane departure determination flag $F_{out}$ is ON ($T_{out}$<Ts), but it is determined from steering input from the driver and so forth that lane departure will not occur, an alarm sound notifying of lane departure is issued by the alarm sound output unit 31.

Here, an example of a case in which the lane departure determination flag $F_{out}$ is ON ($T_{out}<Ts$), but it is determined from the steering input from the driver and so forth that lane departure will not occur. In other words, it is determined that the driver himself has noticed that the host vehicle is in a lane departure tendency and has taken evasive action, but the lane departure determination flag $F_{out}$ itself is still ON ($T_{out}<Ts$).

Second Scenario

When the driving lane curvature β is less than the specific driving lane curvature threshold βL ($β<βL$), and the holding determination flag $F_{strg}$ is ON, that is, when the host vehicle driving lane is straight and the driver is holding the steering wheel 21 steady, the control method is as follows.

An alarm sound is issued when the estimated departure time $T_{out}$ is less than the lane departure determination threshold Ts ($T_{out}<Ts$). Further, braking control (hereinafter referred to as departure-avoidance yaw control) is performed so that yaw moment for avoiding departure will be imparted to the vehicle when the estimated departure time $T_{out}$ becomes less than one-half the lane departure determination threshold Ts (Ts/2) ($T_{out}<(Ts/2)$).

Here, the magnitude of the yaw moment imparted to the vehicle in order to avoid departure is the target yaw moment Ms. The yaw moment is imparted to the vehicle by creating a differential in the braking force applied to the left and right wheels. Specifically, as discussed above, when the target yaw moment Ms is less than the setting threshold Ms1, a braking force differential is generated between the left and right rear wheels to impart the target yaw moment Ms to the vehicle, and when the target yaw moment Ms is greater than or equal to the setting threshold Ms1, a braking force differential is generated between the front and rear left and right wheels to impart the target yaw moment Ms to the vehicle.

Third Scenario

When the driving lane curvature β is less than the specific driving lane curvature threshold βL ($β^2<βL$), and the holding determination flag $F_{strg}$ is OFF, that is, when the host vehicle driving lane is straight and the driver is not holding the steering wheel 21 steady, the control method is as follows.

Figure 7:
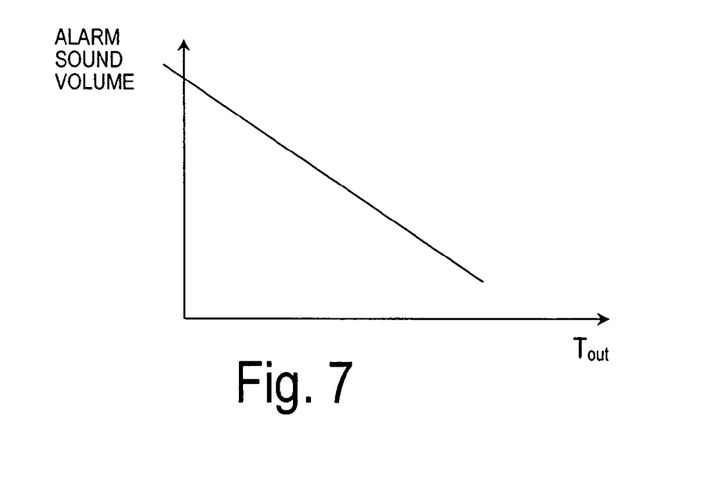
FIG. 7 is a graph of the relationship between the estimated departure time $T_{out}$ and the volume of the alarm sound.

An alarm sound is issued when the estimated departure time $T_{out}$ is less than the modified departure determination threshold (Ts+dTs) ($T_{out}<(Ts+dTs)$). At this point the volume of the alarm sound is increased over that in the first and second scenarios. Furthermore, the shorter is the estimated departure time $T_{out}$, the more the volume is increased. For example, the volume of the alarm sound is set by the relationship shown in FIG. 7 according to the estimated departure time $T_{out}$.

If the driver is still not holding the steering wheel 21 even though the alarm sound has been issued, then departure-avoidance yaw control is performed when the estimated departure time $T_{out}$ becomes less than one-fifth the lane departure determination threshold Ts (Ts/5) ($T_{out}<(Ts/5)$).

The alarm effect can be enhanced by changing the type (such as the frequency) of the alarm sound. Also, the lane departure determination threshold Ts may be multiplied by a specific value, and this product compared with the estimated departure time $T_{out}$. For instance, the alarm sound may be issued when the estimated departure time $T_{out}$ becomes less than a departure determination threshold (Ts× 1.2) ($T_{out}<(Ts×1.2)$).

Fourth Scenario

When the driving lane curvature β is greater than or equal to the specific driving lane curvature threshold βL ($β^2<βL$), and the holding determination flag $F_{strg}$ is ON, that is, when the host vehicle driving lane is curved and the driver is holding the steering wheel 21 steady, the control method is as follows.

An alarm sound is issued when the estimated departure time $T_{out}$ is less than the lane departure determination threshold Ts ($T_{out}<Ts$). Further, departure-avoidance yaw control is performed when the estimated departure time $T_{out}$ becomes less than one-half the lane departure determination threshold Ts (Ts/2) ($T_{out}<(Ts/2)$).

When the estimated departure time $T_{out}$ becomes less than zero ($T_{out}<0$), that is, when the host vehicle has departed from its driving lane, deceleration control for decelerating the vehicle (hereinafter referred to as departure-avoidance deceleration control) is performed in addition to departure-avoidance yaw control. This departure-avoidance deceleration control is performed by applying the same amount of braking force to the left and right wheels.

Fifth Scenario

When the driving lane curvature β is greater than or equal to the specific driving lane curvature threshold βL ($β^2<βL$), and the holding determination flag $F_{strg}$ is OFF, that is, when the host vehicle driving lane is curved and the driver is not holding the steering wheel 21 steady, the control method is as follows.

An alarm sound is issued when the estimated departure time $T_{out}$ is less than the modified departure determination threshold (Ts+dTs) ($T_{out}<(Ts+dTs)$). At this point the volume of the alarm sound is increased, and the shorter is the estimated departure time $T_{out}$, the more the volume is increased, just as in the third scenario. However, departure-avoidance yaw control is not actuated.

The lane departure direction $D_{out}$ is not taken into account in selecting the control method in the first to fifth scenarios above, but the control method may of course be selected by taking the lane departure direction $D_{out}$ into account. For instance, the volume of the alarm sound may be further increased when the host vehicle driving lane is curved and the lane departure direction $D_{out}$ differs from the direction of this curve.

The control method for departure avoidance is thus selected in step S7 on the basis of the above-mentioned road condition, the holding determination flag $F_{strg}$, the lane departure determination flag $F_{out}$, and the lane departure direction $D_{out}$.

Then, in step S10, the target brake hydraulic pressure Psi (i=fl, fr, rl, rr) for each wheel is calculated according to the type of control method selected.

In the lane departure-avoiding yaw control for the second to third scenarios, for example, the target brake hydraulic pressure Psi (i=fl, fr, rl, rr) for each wheel is calculated with Equations (11) below.

$Psfl=Pmf$ $Psfr=Pmf+\Delta Psf$ $Psrl=Pmr$ $Psrr=Pmr+\Delta Psr$ (11)

The lane departure-avoiding yaw control and the lane departure-avoiding deceleration control are carried out in the fourth scenario, but in this scenario the target brake hydraulic pressure Psi (i=fl, fr, rl, rr) for each wheel is calculated with Equations (12) below.

$Psfl=Pmf+Pgf/2$ $$Psfr = Pmf + \Delta Psf + Pgf/2$$

$$Psrl = Pmr + Pgr/2$$

$$Psrr = Pmr + \Delta Psr + Pgr/2 \quad (12)$$

Also, the target brake hydraulic pressure Psi (i=fl, fr, rl, rr) for each wheel is calculated with reference to the deceleration action taken by the driver. In other words, the master cylinder hydraulic pressures Pmf and Pmr are applied, as shown in Equations (11) and (12).

The above is the processing entailed in step S10. Thus, the target brake hydraulic pressure Psi (i=fl, fr, rl, rr) for each wheel is calculated based on the state of the lane departure determination flag $F_{out}$ in step S10. When the lane departure determination flag $F_{out}$ is ON, the target brake hydraulic pressure Psi (i=fl, fr, rl, rr) for each wheel is calculated in accordance with the braking control methods selected in step S7 according to the road condition, the holding determination flag $F_{strg}$, and the lane departure direction $D_{out}$.

Described above is the computational processing performed by the driving/braking force control unit 8. With the driving/braking force control unit 8, the target brake hydraulic pressure Psi (i=fl, fr, rl, rr) calculated for each wheel in step S10 is output to the brake hydraulic pressure control unit 7 as a brake hydraulic pressure command value.

The lane departure prevention apparatus described above operates according to the following overview.

First, various kinds of data are read from the sensors, the controllers, and the control units (step S1). The vehicle speed V is then calculated (step S2).

In step S3, the driving/braking force control unit 8 determines whether the host vehicle driving lane is straight or curved.

In step S4, the driving/braking force control unit 8 determines whether or not the driver is holding the steering wheel 21 steady.

In step S5, the lane departure determination flag $F_{out}$ is set on the basis of the estimated time of departure $T_{out}$, and the lane departure direction $D_{out}$ is determined on the basis of the lateral displacement X (see, FIG. 3).

In step S6, the driver's intention to change lanes is determined on the basis of the lane departure direction $D_{out}$ obtained above and on the direction (lighted blinker side) indicated by the turn switch signal.

For example, when the direction (lighted blinker side) indicated by the turn switch signal is the same as the direction indicated by the lane departure direction $D_{out}$, it is determined that the driver is intentionally changing lanes. In this case, the lane departure determination flag $F_{out}$ is changed to OFF.

When the direction (lighted blinker side) indicated by the turn switch signal and the direction indicated by the lane departure direction $D_{out}$ are different, the lane departure determination flag $F_{out}$ is kept unchanged in the case that it is ON. The reason is that when the direction (lighted blinker side) indicated by the turn switch signal and the direction indicated by the lane departure direction $D_{out}$ are different, the lane departure behavior of the host vehicle may be due to factors other than the driver's intention to change lanes or the like, so the condition of the lane departure determination flag $F_{out}$ is kept unchanged when the flag is ON.

Whether or not a departure avoidance alarm has commenced, whether or not departure-avoidance braking control is performed, and the method for carrying out departure-avoidance braking control are determined on the basis of the road condition, the holding determination flag $F_{srtg}$, the lane departure determination flag $F_{out}$, and the lane departure direction $D_{out}$ (step S7).

Furthermore, the target yaw moment Ms is calculated based on the lateral displacement X and the variation amount dx (step S8), and the lane departure-avoiding deceleration is also calculated (step S9).

The target brake hydraulic pressure Psi (i=fl, fr, rl, rr) for each wheel, which is used to achieve the braking control method selected in step S7, is calculated. This target brake hydraulic pressure Psi (i=fl, fr, rl, rr) is outputted as a brake hydraulic pressure command value to the brake hydraulic pressure control unit 7 (step S10). The brake hydraulic pressure control unit 7 individually controls the brake hydraulic pressure for the wheel cylinders 6FL to 6RR on the basis of the brake hydraulic pressure command value. As a result, an alarm sound is issued, or braking control is performed when the vehicle is in a lane departure tendency.

That is, a departure alarm sound is issued when the lane departure determination flag $F_{out}$ is ON ($T_{out} < Ts$), but it is determined from driver steering operation or the like that no lane departure will occur (first scenario).

Also, when the host vehicle driving lane is straight and the driver is holding the steering wheel 21 steady, an alarm sound is issued when the estimated departure time $T_{out}$ becomes less than the lane departure determination threshold Ts (i.e., $T_{out} < Ts$). Further, the lane departure-avoidance yaw control is performed when the estimated departure time $T_{out}$ becomes less than one-half the lane departure determination threshold Ts (i.e., $T_{out} < Ts/2$—second scenario).

This avoids the lane departure of the host vehicle. Meanwhile, the driver realizes that the host vehicle is in a lane departure tendency when he hears the alarm sound or senses the lateral acceleration produced by the lane departure avoidance action of the vehicle.

When it is determined that the host vehicle driving lane is straight and the driver is not holding the steering wheel 21 steady, an alarm sound is issued when the estimated departure time $T_{out}$ becomes less than the modified departure determination threshold Ts+dTs (i.e., $T_{out} < Ts+dTs$). At this point the volume of the alarm sound is increased over that in the first and second scenarios. Here, the shorter is the estimated departure time $T_{out}$ the more the volume is increased. Furthermore, when an alarm sound has thus been issued, but the driver is not holding the steering wheel 21 steady, the lane departure-avoidance yaw control is performed when the estimated departure time $T_{out}$ becomes less than one-fifth of the lane departure determination threshold Ts (i.e., $T_{out} < Ts/5$—third scenario).

This avoids the lane departure of the host vehicle. Meanwhile, the driver realizes that the host vehicle is in a lane departure tendency when he hears the alarm sound or senses the lateral acceleration produced by the lane departure avoidance action of the vehicle. Also, the driver can be encouraged more strongly to hold the steering wheel 21 by increasing the volume in inverse proportion to the estimated departure time $T_{out}$.

Also, when an alarm sound has been issued, but the driver is not holding the steering wheel 21 steady, the lane departure-avoidance yaw control is performed when the estimated departure time $T_{out}$ becomes less than one-fifth the lane departure determination threshold Ts (i.e., $T_{out} < Ts/5$). Meanwhile, as discussed above, when the driver is holding the steering wheel 21 steady, the lane departure-avoidance yaw control is performed when the estimated departure time $T_{out}$ becomes less than one-half the lane departure determination threshold Ts (i.e., $T_{out} < Ts/2$—second scenario). Thus, when the driver is not holding the steering wheel 21 steady, the lane departure-avoidance yaw control is actuated later than when the driver is holding the steering wheel 21 steady. As a result, the yaw moment imparted to the host vehicle is increased by an amount corresponding to this later actuation of departure-avoidance yaw control, over that when the driver is holding the steering wheel 21 steady.

Also, when the host vehicle driving lane is curved, and the driver is holding the steering wheel 21 steady, an alarm sound is issued when the estimated departure time $T_{out}$ becomes less than the lane departure determination threshold Ts (i.e., $T_{out}$<Ts). Departure-avoidance yaw control is performed when the estimated departure time $T_{out}$ becomes less than one-half the lane departure determination threshold Ts (i.e., $T_{out}$<Ts/2). Further, when the host vehicle has departed from its driving lane, departure-avoidance deceleration control is performed in addition to departure-avoidance yaw control (fourth scenario).

This avoids the lane departure of the host vehicle. Meanwhile, the driver realizes that the host vehicle is in a lane departure tendency when he hears the alarm sound or senses the lateral acceleration produced by the lane departure avoidance action of the vehicle. Also, when the host vehicle has departed from its driving lane, departure avoidance can be carried out more safely by performing departure-avoidance deceleration control in addition to departure-avoidance yaw control.

Also, when it is determined that the host vehicle driving lane is curved, and the driver is not holding the steering wheel 21 steady, an alarm sound is issued when the estimated departure time $T_{out}$ becomes less than the modified departure determination threshold Ts+dTs (i.e., $T_{out}$<Ts+dTs). At this point the volume of the alarm sound is increased, with the volume being increased more the shorter is the estimated departure time $T_{out}$. Meanwhile, no departure-avoidance yaw control is actuated (fifth scenario).

The effects of this embodiment will now be described.

As discussed above, when the host vehicle has a tendency to depart from its driving lane, and the driver is not holding the steering wheel steady, an alarm sound is issued, after which departure-avoidance yaw control is performed as braking control for avoiding the lane departure of the host vehicle.

As a result, the driver can be encouraged by alarm output to hold the steering wheel prior to the commencement of braking control for avoiding lane departure. Thus, even if the driver is not holding the steering wheel steady because the driver is in a state of low wakefulness, for example, the driver can be encouraged to hold the steering wheel steady, which increases safety and allows departure-avoidance yaw control to be performed to avoid lane departure.

Also, as discussed above, when an alarm sound has been issued, but the driver is not holding the steering wheel 21 steady, the lane departure-avoidance yaw control is performed when the estimated departure time $T_{out}$ becomes less than one-fifth the lane departure determination threshold Ts (i.e., $T_{out}$<Ts/5). As a result, when the driver is not holding the steering wheel 21 steady, departure-avoidance yaw control is actuated later than when the driver is holding the steering wheel 21 steady. Further, the yaw moment in this departure-avoidance yaw control is increased over that when the driver is holding the steering wheel 21 steady.

As a result, when the driver is not holding the steering wheel 21 steady, the effect that can be enhanced, that is, safety can be increased while encouraging the driver to hold the steering wheel steady, by delaying the commencement of the lane departure-avoidance yaw control as much as possible.

Since the yaw moment is greater in this departure-avoidance yaw control, the driver is encouraged even more strongly to hold the steering wheel steady.

Also, as discussed above, the volume of the alarm sound when the steering wheel 21 is not being held steady is increased over that when the steering wheel 21 is being held steady. Further, the shorter is the estimated departure time $T_{out}$, the more this volume is increased. As a result, the driver can be strongly encouraged to hold the steering wheel steady by making the alarm sound louder when the steering wheel 21 is not being held steady. Also, if the volume is increased in inverse proportion to the estimated departure time $T_{out}$, the driver can ascertain the state of departure from the volume of the alarm.

Also, as discussed above, the lane departure-avoidance yaw control is not actuated when the driver is not holding the steering wheel 21 steady, and the host vehicle driving lane is curved. If departure-avoidance yaw control is actuated when there is a lane departure tendency while the vehicle is entering a curve, the yaw moment thereof is greater than the usual yaw moment. Thus, in this case the driver is subjected to greater lateral acceleration. Because of this, it becomes more likely that the driver will be unable to hold himself upright if there is a lane departure tendency and departure-avoidance yaw control is actuated upon entry into a curve. Consequently, when the driver is not holding the steering wheel 21 steady, and the host vehicle driving lane is curving, departure-avoidance yaw control is not actuated, which prevents the driver from being unable to hold himself upright, while encouraging the driver to hold the steering wheel steady.

Embodiments of the present invention have been described above, but the present invention is not limited to being realized as the above embodiments. That is, methods of combining-braking control (departure-avoidance yaw control) so that yaw moment for avoiding departure is imparted to the vehicle, and the deceleration control (departure-avoidance deceleration control) for decelerating to avoiding departure, the operating procedures of these methods, and the control amounts thereof (magnitude of the yaw moment and magnitude of the deceleration) were described in detail in the above embodiments, but it should go without saying that the present invention is not limited by these descriptions.

Also, the description in the above embodiments was for a case in which departure-avoidance yaw control was actuated after an alarm sound was issued, or this actuation was delayed, or the lane departure-avoidance yaw control was not actuated, when the driver is not holding the steering wheel 21 steady. However, it should go without saying that the present invention is not limited to this. That is, the case can instead be one in which, for example, departure-avoidance deceleration control is actuated after an alarm sound is issued, or this actuation is delayed, or the lane departure-avoidance deceleration control is not actuated. As a result, when the driver is not holding the steering wheel 21 steady, an alarm sound can be issued so as to prevent the actuation of departure-avoidance deceleration control from causing the driver to lose his balance.

Also, a case in which issuing an alarm sound was the primary example of alarm output was described in the above embodiments, but it should go without saying that the present invention is not limited to this. That is, the alarm output can be an alarm display or anything else that will attract the attention of the driver.

Also, the estimated departure time $T_{out}$ was calculated on the basis of the lateral displacement X and the variation amount dx thereof (see Equation (2) above) in the above embodiments, but the estimated departure time $T_{out}$ can also be obtained by another method. For example, the estimated departure time $T_{out}$ can be obtained on the basis of the yaw angle φ, the driving lane curvature β, the yaw rate φ', or the steering angle δ.

Also, the intention of the driver to change lanes was ascertained in the above embodiments on the basis of the steering angle δ, or on the amount of change Δδ in the steering angle (see step S5), but the intention of the driver to change lanes can instead be obtained by another method. For example, the intention of the driver to change lanes can be ascertained on the basis of steering torque.

Also, the target yaw moment Ms was calculated on the basis of the lateral displacement X and the amount of change dx thereof (see Equation (3) above) in the above embodiments, but the target yaw moment Ms can instead be obtained by another method. For example, the target yaw moment Ms can be obtained on the basis of the yaw angle φ, the lateral displacement X, and the driving lane curvature β as shown in Equation (13) below.

$$Ms = K3 \cdot \phi + K4 \cdot X + K5 \cdot \beta \qquad (13)$$

Here, the terms K3, K4, and K5 are gains that vary or fluctuate with the vehicle speed V.

Also, the target brake hydraulic pressure Pgf for the front wheels was described in the above embodiments by using a specific equation (see Equation (4)), but the present invention is not limited to this. For instance, the target brake hydraulic pressure Pgf for the front wheels can also be calculated from Equation (14) below.

$$Pgf = Kgv \cdot V + Kg\phi \cdot \phi + Kg\beta \cdot \beta \qquad (14)$$

Here, the terms Kgφ and Kgβ are conversion factors that are used for converting braking force into brake hydraulic pressure, and are set on the basis of the yaw angle φ and the driving lane curvature β, respectively.

Also, the target hydraulic pressure differentials ΔPsf and ΔPsr for the front and rear wheels were calculated in order to achieve departure-avoidance yaw control in the above embodiments (see Equations (7) and (8)), but the present invention is not limited to this. For instance, departure-avoidance yaw control can be achieved with the front wheel target hydraulic pressure differential ΔPsf alone. In this case, the front wheel target hydraulic pressure differential ΔPsf is calculated from Equation (15) below.

$$\Delta Psf = 2 \cdot Kbf \cdot Ms/T \qquad (15)$$

In the description of the above embodiments, the processing of the torque sensor 18 and the driving/braking control unit 8 in step S4 constituted the holding state detection section for detecting the state in which the driver is holding the steering wheel; the alarm sound output unit 31 constituted the alarm output section for outputting an alarm; the processing of the driving/braking control unit 8 in step S5 constituted the lane departure tendency detection section for detecting a tendency for the host vehicle to depart from its driving lane; and the processing of the driving/braking control unit 8 in steps S6 to S10 constituted the lane departure-avoidance control section for performing the above-mentioned braking control after an alarm has been issued by the alarm or warning output section when the lane departure tendency detection section has detected a lane departure tendency and the holding state detection section has detected that the driver is not holding the steering wheel steady.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function. Moreover, terms that are expressed as "means-plus function" in the Claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-369449. The entire disclosure of Japanese Patent Application No. 2003-369449 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended Claims and their equivalents. Thus, the scope of the invention is not limited to the disclosed embodiments.

What is claimed is:

1. A lane departure prevention apparatus comprising:
   a holding state detection section configured to detect whether a driver is holding the steering wheel steady;
   a warning output section configured to output a warning;
   a lane departure tendency detection section configured to detect a lane departure tendency of a host vehicle from its driving lane; and
   a lane departure-avoidance control section configured to adjust an amount of time between outputting the warning and performing lane departure avoidance braking control such that the warning is outputted from the warning output section prior to performing the lane departure avoidance braking control when the lane departure tendency detection section detects the lane departure tendency and the holding state detection section detects that the driver is not holding the steering wheel steady.

2. The lane departure prevention apparatus according to claim 1, wherein
   the warning output section is further configured to output an audible sound as the warning.

3. The lane departure prevention apparatus according to claim 2, wherein
   the warning output section is further configured to make the audible sound louder upon determining the driver is not holding the steering wheel steady in comparison to when the driver is holding the steering wheel steady.

4. The lane departure prevention apparatus according to claim 3, wherein the warning output section is further configured to make the audible sound louder as a departure time of the host vehicle departing from the driving lane is estimated to become shorter.

5. The lane departure prevention apparatus according to claim 2, wherein
the warning output section is further configured to make the audible sound louder as a departure time of the host vehicle departing from the driving lane is estimated to become shorter.

6. A lane departure prevention apparatus comprising:
a holding state detection section configured to detect whether a driver is holding the steering wheel steady;
a warning output section configured to output a warning;
a lane departure tendency detection section configured to detect a lane departure tendency of a host vehicle from its driving lane; and
a lane departure-avoidance control section configured to output the warning from the warning output section prior to performing lane departure avoidance braking control when the lane departure tendency detection section detects the lane departure tendency and the holding state detection section detects that the driver is not holding the steering wheel steady,
the lane departure-avoidance control section being further configured to impart a yaw moment by performing the lane departure avoidance braking control to the host vehicle to avoid the lane departure of the host vehicle, with the yaw moment being imparted at a later timing and increased when the driver is not holding the steering wheel steady in comparison to when the driver is holding the steering wheel steady, and the yaw moment being increased.

7. The lane departure prevention apparatus according to claim 6, wherein
the lane departure-avoidance control section is further configured to prohibit the lane departure avoidance braking control to the host vehicle to avoid the lane departure of the host vehicle, upon determining the driver is not holding the steering wheel steady and the host vehicle is traveling around a curve.

8. The lane departure prevention apparatus according to claim 6, wherein
the warning output section is further configured to output an audible sound as the warning.

9. The lane departure prevention apparatus according to claim 8, wherein
the warning output section is further configured to make the audible sound louder upon determining the driver is not holding the steering wheel steady in comparison to when the driver is holding the steering wheel steady.

10. The lane departure prevention apparatus according to claim 9, wherein
the warning output section is further configured to make the audible sound louder as a departure time of the host vehicle departing from the driving lane is estimated to become shorter.

11. The lane departure prevention apparatus according to claim 8, wherein
the warning output section is further configured to make the audible sound louder as a departure time of the host vehicle departing from the driving lane is estimated to become shorter.

12. A lane departure prevention apparatus comprising:
a holding state detection section configured to detect whether a driver is holding the steering wheel steady;
a warning output section configured to output a warning;
a lane departure tendency detection section configured to detect a lane departure tendency of a host vehicle from its driving lane; and
a lane departure-avoidance control section configured to output the warning from the warning output section prior to performing lane departure avoidance braking control when the lane departure tendency detection section detects the lane departure tendency and the holding state detection section detects that the driver is not holding the steering wheel steady,
the lane departure-avoidance control section being further configured to prohibit the lane departure avoidance braking control to the host vehicle to avoid the lane departure of the host vehicle, upon determining the driver is not holding the steering wheel steady and the host vehicle is traveling around a curve.

13. A lane departure prevention apparatus comprising:
holding state detection means for detecting whether a driver is holding the steering wheel steady;
warning output section means for outputting a warning;
lane departure tendency detection means for detecting a lane departure tendency of a host vehicle from its driving lane; and
lane departure avoidance control means for adjusting an amount of time between outputting the warning and performing a lane departure avoidance braking control such that the warning is outputted prior to performing the lane departure avoidance braking control when the lane departure tendency detection means detects the lane departure tendency and the holding state detection means detects that the driver is not holding the steering wheel steady.

* * * * *